US008667313B2

(12) United States Patent
Kim

(10) Patent No.: US 8,667,313 B2
(45) Date of Patent: Mar. 4, 2014

(54) APPARATUS AND METHOD FOR REDUCING POWER CONSUMPTION IN SYSTEM ON CHIP

(75) Inventor: Sung-Min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 12/733,599

(22) PCT Filed: Sep. 10, 2008

(86) PCT No.: PCT/KR2008/005325
§ 371 (c)(1),
(2), (4) Date: Mar. 10, 2010

(87) PCT Pub. No.: WO2009/035254
PCT Pub. Date: Mar. 19, 2009

(65) Prior Publication Data
US 2010/0205468 A1    Aug. 12, 2010

(30) Foreign Application Priority Data

Sep. 11, 2007 (KR) .................. 10-2007-0091962

(51) Int. Cl.
*G06F 1/32* (2006.01)
(52) U.S. Cl.
USPC ............................ 713/322; 713/320; 713/324
(58) Field of Classification Search
None
See application file for complete search history.

(56) References Cited

U.S. PATENT DOCUMENTS

| 5,041,964 | A  | 8/1991  | Cole et al.      |
|-----------|----|---------|------------------|
| 5,617,532 | A  | 4/1997  | Ushiyama         |
| 6,535,982 | B1 | 3/2003  | Kawabe et al.    |
| 6,968,469 | B1 | 11/2005 | Fleischmann et al.|
| 7,171,323 | B2 | 1/2007  | Shipton et al.   |
| 7,181,188 | B2 | 2/2007  | Vu et al.        |
| 7,181,631 | B2 | 2/2007  | Volk             |
| 7,230,933 | B2 | 6/2007  | Bahl et al.      |

(Continued)

FOREIGN PATENT DOCUMENTS

KR    10-2003-0041142      5/2003
KR    1020040062288 A      7/2004

OTHER PUBLICATIONS

International Search Report dated Feb. 26, 2009 in connection with PCT Patent Application No. PCT/KR2008/005325.

(Continued)

*Primary Examiner* — Dennis M Butler

(57) ABSTRACT

An apparatus and method for reducing power consumption in a System on Chip (SoC) are provided. The SoC includes a clock unit for providing clocks to all elements included in the SoC, a Central Processing Unit (CPU) for controlling the SoC to perform designated functions, a main regulator for supplying power provided from an external battery to remaining elements included in the SoC other than a PMU, and a restoration processor for storing, in the PMU, registration information on the CPU and all peripherals included in the SoC when a transition from an active state to a sleep state is made. The PMU stops provision of a clock from the CPU by controlling the clock unit for stopping provision of all clocks by controlling the clock unit and for controlling the main regulator to be powered off when the restoration processor, wherein the PMU requests the restoration processor to store the registration information, completes the register information storing, when the transition from the sleep state to the active state is made.

20 Claims, 4 Drawing Sheets

(56) References Cited

U.S. PATENT DOCUMENTS

| | | |
|---|---|---|
| 2006/0064606 A1 | 3/2006 | Kim et al. |
| 2006/0187226 A1 | 8/2006 | Bruno et al. |
| 2008/0091965 A1* | 4/2008 | Nychka et al. ............... 713/323 |
| 2008/0168285 A1* | 7/2008 | de Cesare et al. ............ 713/320 |
| 2009/0089562 A1* | 4/2009 | Schuchman et al. .......... 712/228 |

OTHER PUBLICATIONS

Extended Search Report dated Oct. 5, 2012 in connection with European Patent Application No. 08793747.0, 6 pages.

Notice of Preliminary Rejection dated Nov. 28, 2013 in connection with Korean Patent Application No. 10-2007-0091962, 12 pages.

* cited by examiner

APPARATUS AND METHOD FOR REDUCING POWER CONSUMPTION IN SYSTEM ON CHIP

CROSS-REFERENCE TO RELATED APPLICATION(S)

The present application claims priority under 35 U.S.C. §365 to International Patent Application No. PCT/KR2008/005325 filed Sep. 10, 2008, entitled "APPARATUS AND METHOD FOR REDUCING POWER CONSUMPTION IN SYSTEM ON CHIP". International Patent Application No. PCT/KR2008/005325 claims priority under 35 U.S.C. §365 and/or 35 U.S.C. §119(a) to Korean Patent Application No. 10-2007-0091962 filed Sep. 11, 2007 and which are incorporated herein by reference into the present disclosure as if fully set forth herein.

TECHNICAL FIELD

The present invention relates to an apparatus and method for reducing power consumption in a System on Chip (SoC). More particularly, the present invention relates to an apparatus and method for reducing power consumption by performing an operation of an SoC in such a manner that last operation information of all elements included in the SoC is stored when the SoC is powered off and the stored last operation information is restored when the SoC is powered on.

BACKGROUND ART

In general, a System on Chip (SoC) used in communication systems controls power by using several methods for reducing power consumption. When the SoC is used in a Wireless Personal Area Network (WPAN), the SoC operates in an active state for a short period of time and operates in a sleep state for most periods of time to minimize power consumption.

A control method for reducing power consumption of the SoC may be implemented in a software manner. However, an operation of a Central Processing Unit (CPU) and the use of program memories may increase power consumption. Therefore, in general, it is more effective to implement the control method in a hardware manner.

There are three representative conventional methods for reducing power consumption in a hardware manner. In a first method, in order to reduce power consumption, an internal clock is off when power is off. In this method, the clock provided to all elements of the SoC can be controlled for each element by determining an active state of the SoC. Further, in this method, power consumed by a dynamic current can be reduced by turning off the clock, while power consumed by a leakage current cannot be reduced. In a WPAN-type SoC, a sleep state occupies more than 80% of chip operations, and thus the leakage current is more important than the dynamic current. Accordingly, the first method cannot ultimately solve the power consumption problem.

In a second method, a special register called a retention register is used. The retention register can store a present state by using data retention power when operation power is off. The retention register has an element capable of storing data by consuming a minimum leakage current by the use of retention power. However, the retention register is almost two times larger in size than a general register. In addition, since the retention register is not in a full power-off state, the leakage current leads to power consumption.

In a third method, a previous state, which is immediately before power is off, is restored through initialization in which register information of the CPU and peripherals included in the SoC is lost and then the SoC is entirely reset when power is on by performing an actual power-off.

Among the aforementioned three methods, the third method is a best method in terms of reducing power consumption. However, when power is on, it takes time to restore the previous state, which is immediately before the power is off, through reset and initialization, and during the time, power is consumed due to an operation of the SoC.

DISCLOSURE OF INVENTION

Technical Problem

An aspect of the present invention is to solve at least the above-mentioned problems and/or disadvantages and to provide at least the advantages described below. Accordingly, an aspect of the present invention is to provide an apparatus and method for reducing power consumption in a System on Chip (SoC).

Another aspect of the present invention is to provide an apparatus and method for reducing power consumption by operating only an auxiliary regulator that detects a transition from a sleep state to an active state in a SoC.

Another aspect of the present invention is to provide an apparatus and method for reducing power consumption by performing an operation of an SoC in such a manner that last operation information of all elements included in the SoC is stored when the SoC is powered off and the stored last operation information is restored when the SoC is powered on.

In accordance with an aspect of the present invention, an SoC for reducing power consumption is provided. The SoC includes a clock unit for providing clocks to all elements included in the SoC, a Central Processing Unit (CPU) for controlling the SoC to perform designated functions, a main regulator for supplying power provided from an external battery to remaining elements included in the SoC other than a Power Management Unit (PMU), a restoration processor for storing, in the PMU, registration information on the CPU and all peripherals included in the SoC when a transition from an active state to a sleep state is made. The PMU for stopping provision of a clock from the CPU by controlling the clock unit, for stopping provision of all clocks by controlling the clock unit and for controlling the main regulator to be powered off when the restoration processor, wherein the PMU requests the restoration processor to store the registration information, completes the register information storing, when the transition from the sleep state to the active state is made.

In accordance with another aspect of the present invention, a method of reducing power consumption in an SoC is provided. The method includes stopping generation of a clock to be provided to a CPU by detecting a transition from an active state to a sleep state in a PMU, storing register information of the CPU and peripherals included in the SoC, stopping provision of all clocks of the SoC, and powering off a main regulator.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

BEST MODE FOR CARRYING OUT THE INVENTION

Exemplary embodiments of the invention will be described below with reference to the accompanying drawings. In the following description, well-known functions or constructions are not described in detail since they would obscure the invention in unnecessary detail.

The present invention relates to an apparatus and method for reducing power consumption by performing an operation of a System on Chip (SoC) in such a manner that last operation information of all elements included in the SoC is stored using an auxiliary regulator that consumes a small amount of power when the SoC is powered off in a sleep state, and the stored last operation information is restored when the SoC is powered on. Hereinafter, a structure of the SoC will be described with reference to FIG. 1.

Figure 1:
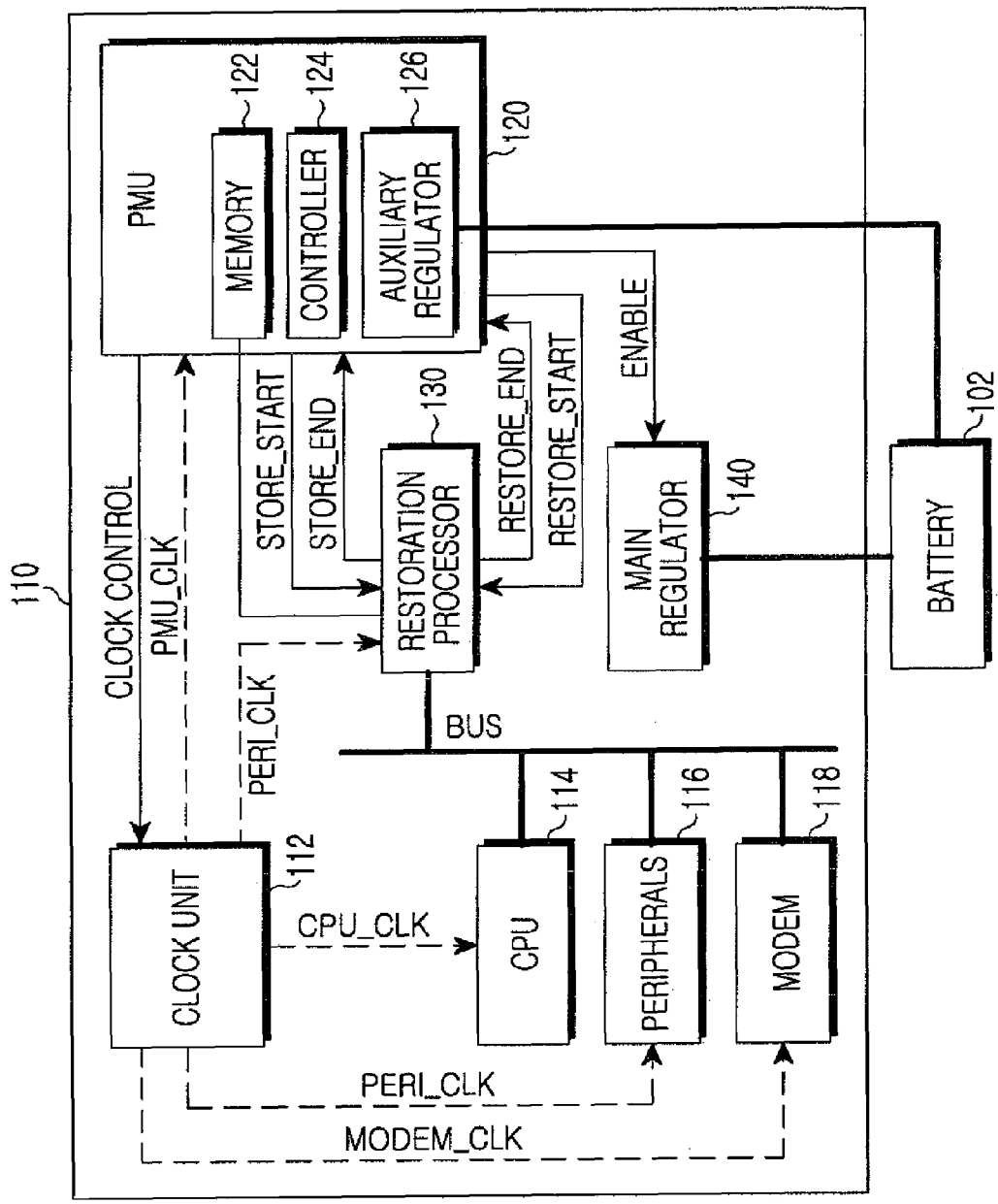
FIG. 1 illustrates a structure of a System on Chip (SoC) according to an exemplary embodiment of the present invention.

FIG. 1 illustrates a structure of an SoC according to an exemplary embodiment of the present invention. Referring to FIG. 1, an SoC 110 includes a clock unit 112, a Central Processing Unit (CPU) 114, peripherals 116, a modem 118, a Power Management Unit (PMU) 120, a restoration processor 130, and a main regulator 140.

The clock unit 112 provides clocks to the CPU 114, the peripherals 116, the modem 118, the PMU 120, and the restoration processor 130 under the control of the PMU 120.

The CPU 114 controls the SoC 110 to provide designated functions of the SoC 110, and has a register for storing information generated when the designated functions are performed.

The peripherals 116 and the modem 118 are included according to the designated functions of the SoC 110. The functions of the peripherals 116 and the modem 118 may vary depending on functional implementations. The peripherals 116 and the modem 118 also have registers for storing information generated when the designated functions are performed.

The main regulator 140 rectifies an unregulated high voltage of an external batter 102 so that the high voltage is fit to the operation of the SoC 110, thereby supplying a constant voltage. The main regulator 140 receives from the PMU 120 a control signal for determining whether power is supplied. The main regulator 140 supplies the power to all elements of the SoC 110 other than the PMU 120.

The PMU 120 controls the main regulator 140 to reduce consumption of power supplied to the SoC 110. The PMU 120 includes a memory 122, a controller 124, and an auxiliary regulator 126.

When power is off and thus a transition to a sleep state is made under the control of the restoration processor 130, the memory 122 stores last states of respective registers of the CPU 114, the peripherals 116, and the modem 118. When power is on and thus a transition to an active state is made, the memory 122 provides the stored last states of the respective registers of the CPU 114, the peripherals 116, and the modem 118 to the restoration processor 130.

The auxiliary regulator 126 supplies a constant voltage power to the PMU 120. The auxiliary regulator 126 has a lower operation current and power consumption than the main regulator 140. Once power is supplied from the battery 102 after booting, the auxiliary regulator 126 continuously operates in the sleep state or the active state.

The controller 124 detects the transition to the sleep state or the active state. When the transition to the sleep state is made, the controller 124 controls the clock unit 112 to stop generation of the clock to be provided to the CPU 114, and transmits a storage request message (i.e., store_start) to start storing of the last states of the various registers. Upon receiving a storage completion message (i.e., store_end) from the restoration processor 130 to indicate that the last states of the various registers are completely stored, the controller 124 controls the clock unit 112 to stop generation of the clocks to be provided to remaining elements other than the CPU 114, and transmits a power-off signal to the main regulator 140.

When the transition from the sleep state to the active state is detected, the controller 124 transmits a power-on signal to the main regulator 140, and controls the clock unit 112 to generate the clocks to be provided to the remaining elements other than the CPU 114. Further, the controller 124 transmits a restoration request message (i.e., restore_start) to the restoration processor 130 to start restoration of the last states of the various registers by using stored information. Upon receiving from the restoration processor 130 a restoration completion message (i.e., restore_end) for informing that the last states of the various registers are completely restored, the controller 124 controls the clock unit 112 to generate the clock to be provided to the CPU 114, so that the SoC 110 normally operates in the active state to perform the designated functions.

The controller 124 determines that the transition from the sleep state to the active state is detected when a reset signal or an interrupt signal is received from an external element or when generation of a wake-up signal is detected according to an operation of a sleep timer.

Upon receiving the store request message (i.e., store_start) from the controller 124, the restoration processor 130 stores in the memory 122 the last states of the respective registers of the CPU 114, the peripherals 116, and the modem 118. When the storing of the last states is finished, the restoration processor 130 generates the storage completion message (i.e., store_end) and transmits the generated message to the controller 124.

Further, upon receiving the restoration request message (i.e., restore_start) from the controller 124, the restoration processor 130 restores the respective registers' last states stored in the memory 122. When the restoration of the last states is finished, the restoration processor 130 generates the restoration completion message (i.e., restore_end) and transmits the generated message to the controller 124.

Now, a method of reducing power consumption in an SoC with the aforementioned structure according to exemplary embodiments of the present invention will be described with reference to the accompanying drawings. In this method, a last state is stored when the SoC is powered off and is restored using stored information when the SoC is powered on.

Figure 2:
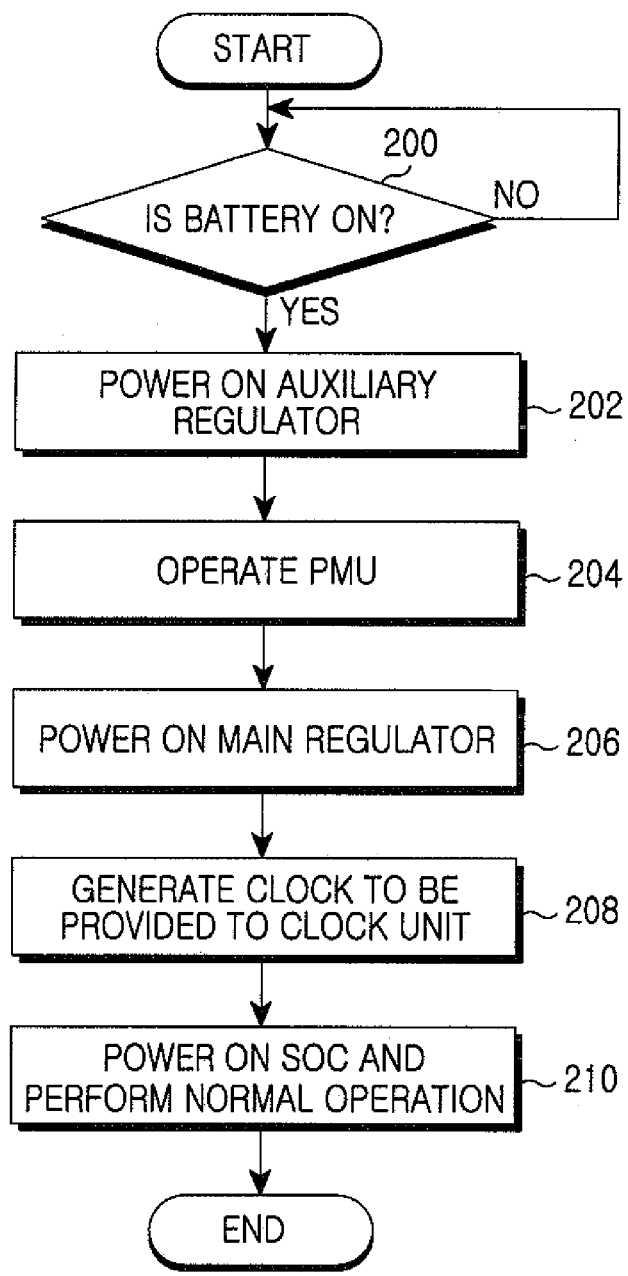
FIG. 2 is a flowchart illustrating a process in which an SoC is initialized by transitioning from a battery-off state to a battery-on state according to an embodiment of the present invention.

FIG. 2 is a flowchart illustrating a process in which an SoC is initialized by transitioning from a battery-off state to a battery-on state according to an embodiment of the present invention. Referring to FIG. 2, in step 200, the SoC detects a transition from the battery-off state to the battery-on state. The battery-off state is a state in which power cannot be supplied from a battery. The battery-on state is a state at which power starts to be supplied from the battery. In step 202, an auxiliary regulator is powered on. In step 204, when a regulated voltage is supplied from the auxiliary regulator, a PMU for managing the SoC operates. In step 206, under the control of the PMU, a main regulator is powered on. In step 208, when a regulated voltage is supplied from the main regulator, clocks are generated and provided to all elements included in the SoC. In step 210, designated functions of the SoC are performed by operating the SoC in an active state in which the SoC is powered on.

Figure 3:
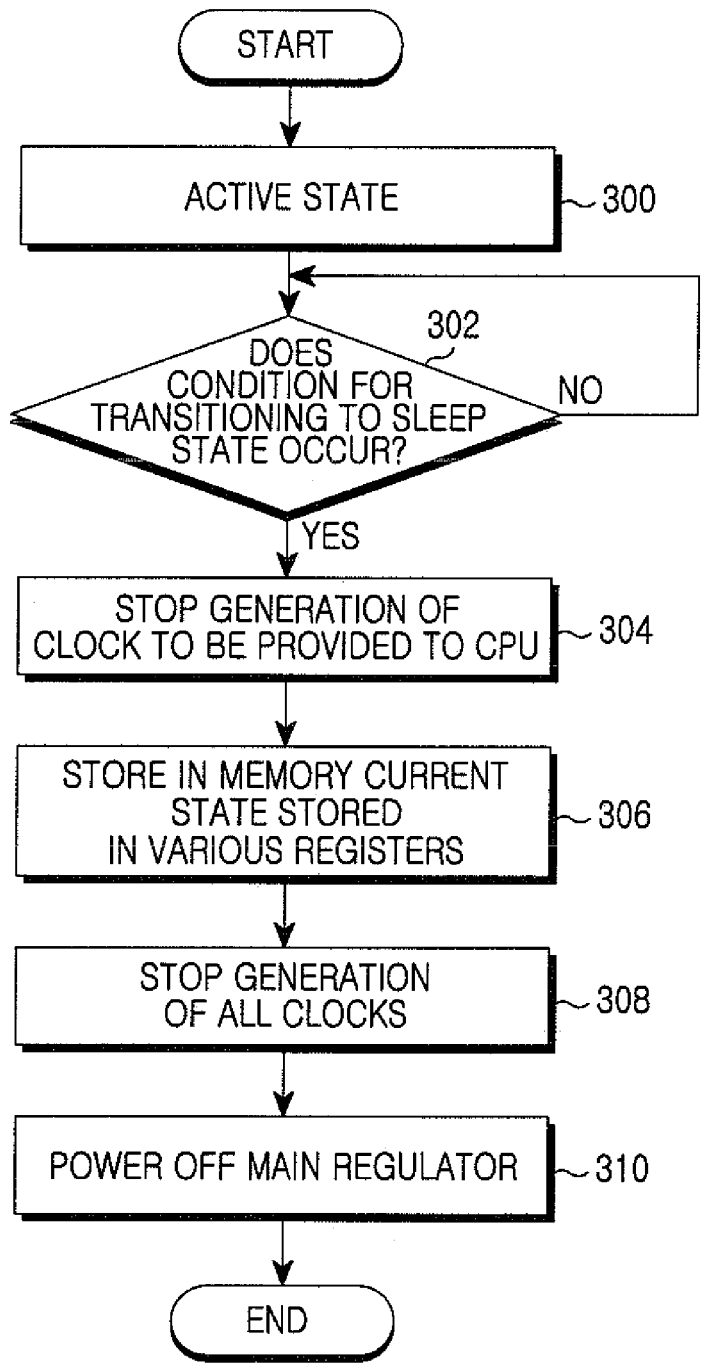
FIG. 3 is a flowchart illustrating a process in which an SoC is powered off in an active state and then transitions to a sleep state according to an exemplary embodiment of the present invention.

FIG. 3 is a flowchart illustrating a process in which an SoC is powered off in an active state and then transitions to a sleep state according to an exemplary embodiment of the present invention. Referring to FIG. 3, while operating in the active state in step 300, if the SoC detects occurrence of a condition for transitioning to the sleep mode in step 302, generation of a clock to be provided to a CPU is stopped in step 304. Then, in step 306, last states of respective registers of peripherals and the CPU are stored. In step 308, generation of all clocks of the SoC is stopped. In step 310, a main regulator is powered off, and a transition is made to the sleep mode.

Figure 4:
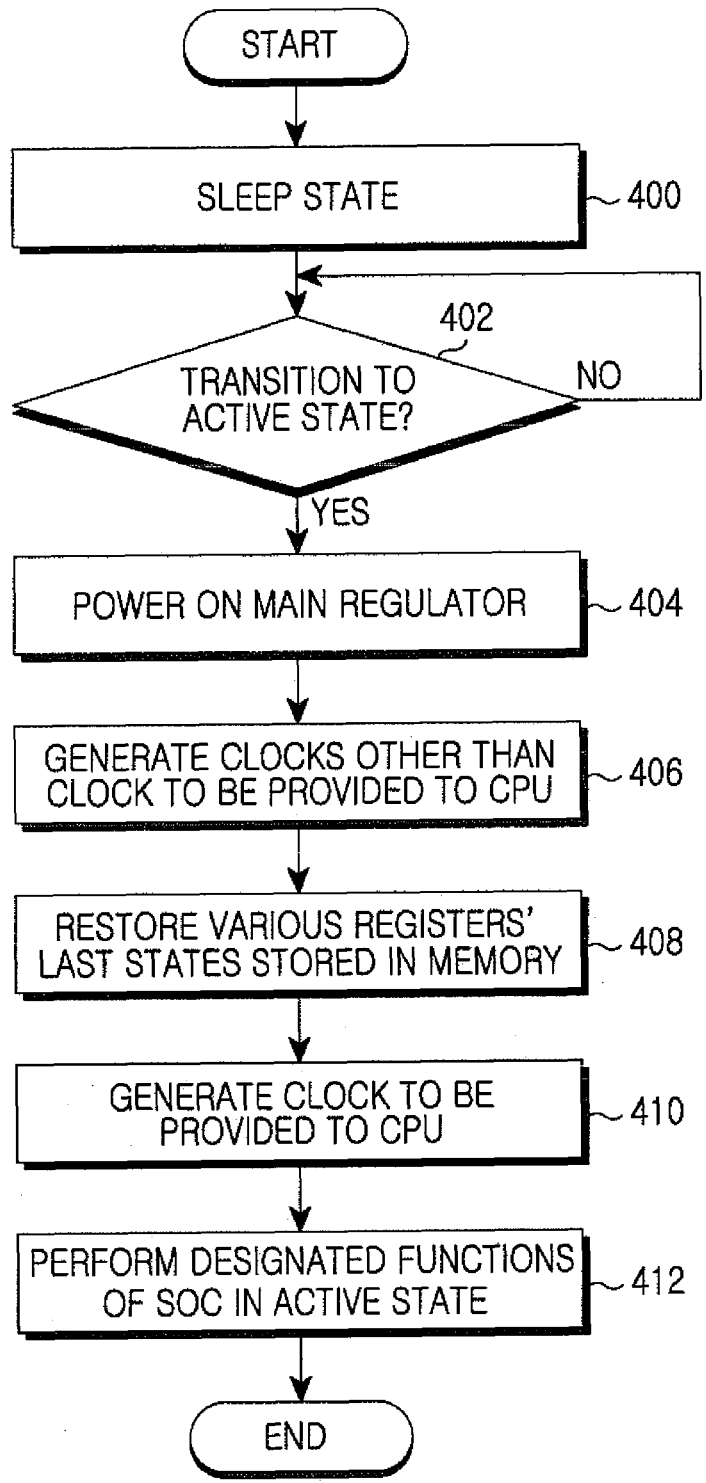
FIG. 4 is a flowchart illustrating a process in which an SoC is powered on in a sleep state and then transitions to an active state according to an exemplary embodiment of the present invention.

FIG. 4 is a flowchart illustrating a process in which an SoC is powered on in a sleep state and then transitions to an active state according to an exemplary embodiment of the present invention. Referring to FIG. 4, while operating in the sleep state in step 400, the SoC detects occurrence of a condition for transitioning to the active state in step 402. The condition for detecting transitioning from the sleep state to the active state in step 402 may be receiving of a reset signal or an interrupt signal from an external element or generating of a wake-up signal according to an operation of a sleep timer.

If the condition for transitioning to the active state is detected in step 402, proceeding to step 404, a main regulator is powered on. In step 406, clocks are provided to all elements included in the SoC other than a CPU. In step 408, last states of registers of the respective elements included in the SoC are restored using stored information. In step 410, a clock is provided to the CPU. In step 412, designated functions of the SoC are performed in the active state. The reason of not providing the clock to the CPU in step 406 is that, if the CPU operates before the last state is restored, the CPU starts an initial operation on a program. That is, according to the present invention, the clock is provided to the CPU after all elements are completely restored, so that the CPU starts its operation starting from a program address of an operation previously performed before power is off.

According to exemplary embodiments of the present invention, an SoC includes a clock unit for providing clocks to all elements included in the SoC, a CPU for controlling the SoC to perform designated functions, a main regulator for supplying power provided from an external battery to remaining elements included in the SoC other than a PMU, and a restoration processor for storing, in the PMU, registration information on the CPU and all peripherals included in the SoC when a transition from an active state to a sleep state is made. The PMU stops provision of a clock from the CPU by controlling the clock unit for stopping provision of all clocks by controlling the clock unit and for controlling the main regulator to be powered off when the restoration processor, wherein the PMU requests the restoration processor to store the registration information, completes the register information storing, when the transition from the sleep state to the active state is made.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

The invention claimed is:

1. A System on Chip (SoC) configured to reduce power consumption, the SoC comprising:
a clock unit configured to provide clock signals to all elements included in the. SoC, the elements comprising a modem and one or more peripheral elements;
a main regulator configured to supply power provided from an external battery to remaining elements included in the SoC other than a Power Management Unit (PMU); and
processing circuitry configured to:
control the SoC to perform designated functions;
stop the clock signal to a CPU by controlling the clock unit when a transition from an active state to a sleep state is made;
store, in the PMU, register information associated with the CPU and all of the peripherals included in the SoC after the clock signal is stopped to the CPU;
when the storing of register information is completed, stop provision of all clock signals to all of the elements by controlling the clock unit and control the main regulator to be powered off when the transition from the active state to the sleep state is made;
control the main regulator to be powered on and provide the clock signal to the all of the peripherals other than the CPU when a transition from the sleep state to the active state is made;
restore all register information associated with the CPU and the all of the peripherals included in the SoC after the clock signal is provided to the all of the peripherals other than the CPU; and
when the restoring of the register information is completed, provide the clock signal to the CPU.

2. The SoC of claim 1, wherein the PMU comprises an auxiliary regulator configured to supply the PMU with power provided from the external battery.

3. The SoC of claim 2, wherein the auxiliary regulator is configured to supply power to the PMU in the active state and the sleep state.

4. The SoC of claim 2, wherein the auxiliary regulator is configured to have a lower operation current and power consumption than the main regulator.

5. The SoC of claim 1, wherein the SoC is configured in a Wireless Personal Area Network (WPAN).

6. The SoC of claim 1, wherein the clock unit, the main regulator, the processing circuitry, the PMU, and the one or more peripheral elements are all integrally formed in the SoC.

7. A method of reducing power consumption in an SoC, the method comprising:
stopping generation of a clock signal provided to a CPU by detecting a transition from an active state to a sleep state in a Power Management Unit (PMU);
storing register information of the CPU and peripherals included in the SoC after the clock signal is stopped to the CPU;

when the storing of register information is completed, stopping provision of all clock signals to all elements, the elements comprising a modem and one or more peripheral elements;

powering off a main regulator;

powering on the main regulator and providing clock signals to elements included in the SoC other than the CPU by detecting a transition from the sleep state to the active state;

restoring the stored register information of the CPU and the peripherals included in the SoC after the clock signal is provided to the all of the peripherals other than the CPU; and providing the clock signal to the CPU, when the restoring of the register information is completed.

8. The method of claim 7, further comprising:

powering on an auxiliary regulator of the PMU when a battery is powered on in a battery-off state;

powering on the main regulator under the control of the PMU; and providing clock signals to all elements included in the SoC.

9. The method of claim 7, wherein the PMU comprises an auxiliary regulator for supplying power to the PMU, the power being provided from an external battery.

10. The method of claim 9, wherein the auxiliary regulator supplies power to the PMU in an active state and a sleep state.

11. The method of claim 9, wherein the auxiliary regulator has a lower operation current and power consumption than the main regulator.

12. The method of claim 7, wherein the SoC is configured in a Wireless Personal Area Network (WPAN).

13. The method of claim 7, wherein the clock unit, the main regulator, the processing circuitry, the PMU, and the one or more peripheral elements are all integrally formed in the SoC.

14. A network element comprising:

a System on Chip (SoC) comprising:

a clock unit configured to provide clock signals to all elements included in the SoC, the elements comprising a modem and one or more peripheral elements;

a Central Processing Unit (CPU) coupled to a main regulator and configured to supply power to remaining elements included in the SoC other than a Power Management Unit (PMU); and processing circuitry configured to:

control the SoC to perform designated functions;

stop the clock signal to the CPU by controlling the clock unit when a transition from an active state to a sleep state is made;

store, in the PMU, register information on the CPU and all of the peripherals included in the SoC after the clock signal is stopped to the CPU;

when the storing of register information is completed, stop provision of all clock signals to all of the elements by controlling the clock unit and control the main regulator to be powered off when the transition from the sleep state to the active state is made;

control the main regulator to be powered on and provide the clock signal to the all of the peripherals other than the CPU when a transition from the sleep state to the active state is made;

restore all register information of the CPU and the all of the peripherals included in the SoC after the clock signal is provided to the all of the peripherals other than the CPU; and when the restoring of the register information is completed, provide the clock signal to the CPU.

15. The network element of claim 14, wherein the PMU comprises an auxiliary regulator configured to supply the PMU with power provided from the external battery.

16. The network element of claim 15, wherein the auxiliary regulator is configured to supply power to the PMU in the active state and the sleep state.

17. The network element of claim 15, wherein the auxiliary regulator is configured to have a lower operation current and power consumption than the main regulator.

18. The network element of claim 15, wherein the main regulator configured to supply power provided from an external battery.

19. The network element of claim 15, wherein the SoC is configured in a Wireless Personal Area Network (WPAN).

20. The network element of claim 15, wherein the clock unit, the main regulator, the processing circuitry, the PMU, and the one or more peripheral elements are all integrally formed in the SoC.

* * * * *